July 17, 1923.
V. IVARSON
1,462,341
TRACTOR ATTACHMENT
Original Filed April 16, 1920
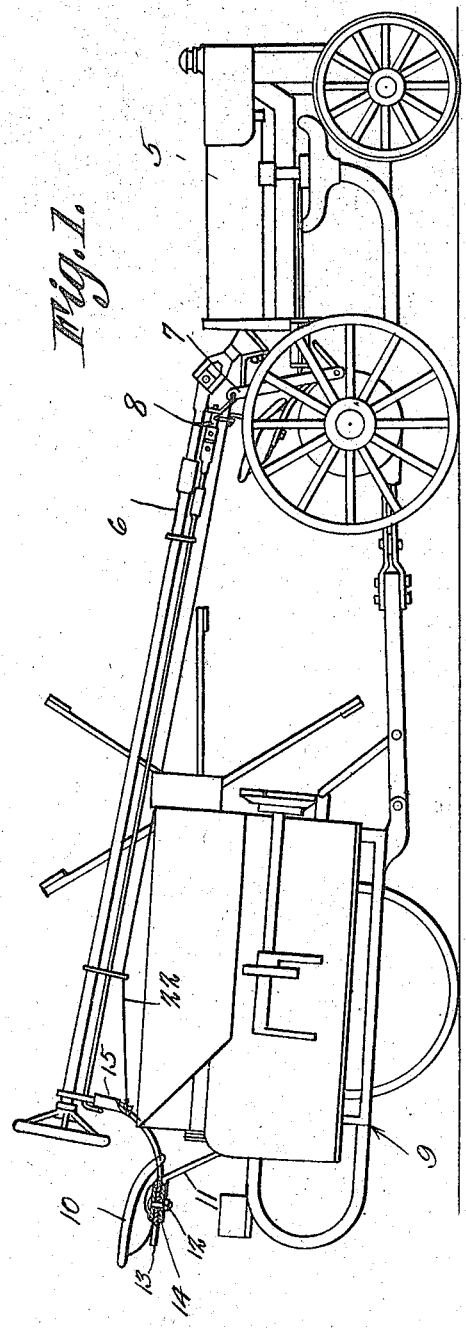
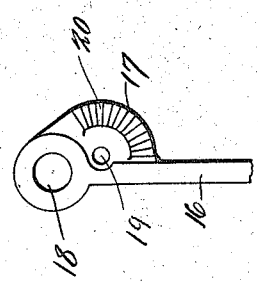
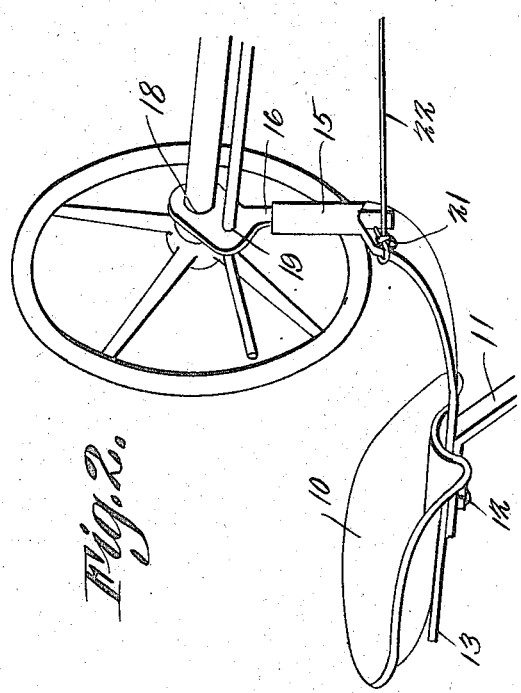
Inventor,
Victor Ivarson.
by Francis Appleman
Attorney.

Patented July 17, 1923.

1,462,341

UNITED STATES PATENT OFFICE.

VICTOR IVARSON, OF CLEGHORN, IOWA, ASSIGNOR TO WILLIAM F. HUTTON, OF CHEROKEE, IOWA.

TRACTOR ATTACHMENT.

Application filed April 16, 1920, Serial No. 374,338. Renewed June 11, 1923.

*To all whom it may concern:*

Be it known that I, VICTOR IVARSON, a citizen of the United States of America, and resident of Cleghorn, in the county of Cherokee and State of Iowa, have invented certain new and useful Improvements in Tractor Attachments, of which the following is a specification.

This invention relates to tractor attachments and particularly to a device for use in detachably connecting tractor controlling or guiding devices and fuel control means to a trailer which is operated or drawn by a tractor, and the said invention appertains to a support that is attachable to the seat of a trailer, to maintain means for controlling a tractor, as illustrated and described, but not specifically claimed in Patent No. 1,329,711; dated February 3, 1920.

An object of this invention is to provide novel means for attaching a support to a seat of a trailer, the said seat to be occupied by the operator so that the steering mechanism, the clutch controlling mechanism and the fuel controlling mechanism will be within convenient reach of the occupant of the trailer.

The device furthermore has for its object, the provisions of means whereby the said supporting device may be applied to or removed from the seat of a trailer so that the tractor can be changed from one trailer to another with the steering mechanism support available for use on different trailers.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 is a side elevation showing my invention applied to a trailer which is attached to a tractor;

Figure 2 is a perspective view; and

Figure 3 is a rear elevation of a combined post and bracket.

In these drawings I have shown a tractor 5, steering mechanism 6, clutch controlling mechanism 7, fuel controlling mechanism 8, which are very similar to devices which are disclosed in my Patent #1,329,711 of February 3, 1920.

I do not of course wish to be limited with respect to any particular mechanism with which this supporting device shall be associated, and I will therefore not describe the mechanisms in detail.

The trailer 9 has the usual seat 10 which is secured to the support 11 by a bolt 12, which also secures in place a plate or flat member 13 that curves upward and forward, in advance of the aperture 14, through which is passed the bolt 12 that connects the member 13 to the seat support 11. The member 13 is shaped to provide a vertical socket 15 for the reception of the post 16 that is integral with a bracket member 17. The bracket member 17 of the post 16 has an aperture 18 through which passes the steering rod; also an aperture 19 for the passage of the throttle controlling rod. The bracket has on its rear face, serrations 20 to be engaged by the handle end of the throttle rod to hold the said throttle rod at different positions of adjustment, due to the roughened or serrated condition of the face of the bracket, it being understood that sufficient friction between the handle end of the throttle rod and the said bracket will result to hold the throttle rod at different positions of adjustment.

The plate or flat member furthermore has an aperture 21 just below the socket which is intended to receive the flexible member 22 which may extend to the clutch controlling mechanism so that the said flexible member will be within convenient reach of the operator, in order that he may, while steering the tractor and controlling the fuel supply, manipulate the clutch to attain the best advantages in the operation of the tractor.

By reason of the fact that parts of the tractor controlling mechanism are mounted in the bracket of which the post is a part, these elements are movable at the time the plate is transferred from one trailer to another.

It is believed the construction, operation and advantages will be understood from the foregoing description, and it will be understood that the device is intended to be manufactured and sold as an independent article for use in connection with any style or type of trailer.

I claim:

1. In a device for maintaining tractor controlling mechanisms on a trailer, the combination with a seat support for the trailer, a flat and longitudinally curved member which is detachably secured to the seat support, said member having at its forward end an upstanding tubular socket, a member having a post for movable engagement with the socket, said post having at its upper portion apertures for the passage therethrough and the support of tractor controlling rods.

2. In a device for maintaining tractor controlling rods in engagement with a trailer, the combination with a seat support of the trailer, a resilient member which curves upwardly and forwardly, said member having associated therewith a tubular socket, means for detachably connecting the rear end of said member to the seat support, a post supported by the forward and upward extending end of the member attached to the seat support, said member having at its upper portion an eye and below said eye an opening serving as supports for a tractor steering rod and a throttle controlling rod.

VICTOR IVARSON.